(12) United States Patent
Nakagawa et al.

(10) Patent No.: US 9,950,668 B2
(45) Date of Patent: Apr. 24, 2018

(54) DEVICE FOR PROVIDING DRIVING SUPPORT BASED ON PREDICTED POSITION OF PRECEEDING VEHICLE

(71) Applicant: TOYOTA JIDOSHA KABUSHIKI KAISHA, Toyota-shi, Aichi-ken (JP)

(72) Inventors: Yuuki Nakagawa, Toyokawa (JP); Yohei Fujii, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/336,160

(22) Filed: Oct. 27, 2016

(65) Prior Publication Data
US 2017/0166124 A1    Jun. 15, 2017

(30) Foreign Application Priority Data
Dec. 10, 2015    (JP) .................. 2015-240863

(51) Int. Cl.
*G08G 1/16*    (2006.01)
*B60Q 9/00*    (2006.01)
(Continued)

(52) U.S. Cl.
CPC .......... *B60Q 9/008* (2013.01); *G08G 1/0112* (2013.01); *G08G 1/0125* (2013.01);
(Continued)

(58) Field of Classification Search
CPC .......... G08G 1/16; G08G 1/161–1/163; G08G 1/166; G08G 1/0112; G08G 1/0125;
(Continued)

(56) References Cited

U.S. PATENT DOCUMENTS

2002/0036584 A1* 3/2002 Jocoy .............. G01S 13/931
 701/301
2007/0276600 A1* 11/2007 King .............. G08G 1/042
 340/903
(Continued)

FOREIGN PATENT DOCUMENTS

JP    2008-021181 A    1/2008
JP    2014-006609 A    1/2014

*Primary Examiner* — Thomas Mullen
(74) *Attorney, Agent, or Firm* — Oliff PLC

(57) ABSTRACT

A support processor performs driving support processing of outputting a warning when it is judged that there is a possibility of collision between a subject vehicle and another vehicle based on subject vehicle information acquired by a subject vehicle information acquirer and another vehicle information acquired by an another vehicle information acquirer. A subject vehicle information predictor predicts an arrival time required until a subject vehicle arrives at an intersection based on subject vehicle information. A preceding vehicle information predictor predicts the position of a preceding vehicle at the time when a predicted arrival time elapses, based on preceding vehicle information acquired by a preceding vehicle information acquirer. A support execution determiner determines whether to permit or forbid the support processor to perform driving support processing according to a predicted position of a preceding vehicle.

3 Claims, 9 Drawing Sheets

(51) Int. Cl.
*G08G 1/01* (2006.01)
*G08G 1/0962* (2006.01)

(52) U.S. Cl.
CPC ......... *G08G 1/09626* (2013.01); *G08G 1/163* (2013.01); *G08G 1/166* (2013.01)

(58) Field of Classification Search
CPC .............. G08G 1/09626; B60W 30/16; B60W 30/18154; G01S 13/93; G01S 13/931; G01S 2013/9353; G01S 2013/936; B60C 9/008
USPC .................. 340/435, 903; 701/300, 301, 408
See application file for complete search history.

(56) References Cited

U.S. PATENT DOCUMENTS

| | | |
|---|---|---|
| 2008/0015772 A1 | 1/2008 | Sanma et al. |
| 2008/0133136 A1* | 6/2008 | Breed ................... B60N 2/2863 340/435 |
| 2012/0016581 A1* | 1/2012 | Mochizuki ............. G08G 1/161 701/301 |
| 2014/0358392 A1* | 12/2014 | Shimizu ................. G08G 1/166 701/301 |
| 2016/0071417 A1* | 3/2016 | Lewis .................... G08G 1/162 701/301 |
| 2016/0086490 A1* | 3/2016 | Ando .................... B60W 30/08 701/301 |

* cited by examiner

DEVICE FOR PROVIDING DRIVING SUPPORT BASED ON PREDICTED POSITION OF PRECEEDING VEHICLE

BACKGROUND OF THE INVENTION

1. Field of the Invention

The present invention relates to a technique for supporting driving at an intersection.

2. Description of the Related Art

Patent Document 1 discloses an assist information providing device that does not provide drive-assist information when a subject vehicle is to turn right at an intersection and there is a preceding vehicle waiting to turn right in front of the subject vehicle, i.e., when the subject vehicle is present at the second or a subsequent position in a queue of vehicles waiting to turn right. Also, Patent Document 2 discloses a driving support device that notifies the driver of information regarding another vehicle when it is judged that the subject vehicle may collide with the another vehicle at an intersection. The driving support device disclosed in Patent Document 2 forbids the notification of information regarding another vehicle when a preceding vehicle is detected between the subject vehicle and intersection, and the driving support device permits the notification when no preceding vehicle is detected.

[Patent Document 1] Japanese Unexamined Patent Application Publication No. 2008-21181

[Patent Document 2] Japanese Unexamined Patent Application Publication No. 2014-6609

In the driving support techniques proposed in Patent Documents 1 and 2, when a preceding vehicle near an intersection is detected, whether or not to perform notification is determined according to the position of the detected preceding vehicle. Patent Document 2 also discloses that, even when a preceding vehicle is detected between the subject vehicle and intersection, if the preceding vehicle passes through the intersection thereafter, notification for alerting the driver to an approaching vehicle is performed at the timing when the preceding vehicle passes through the intersection.

Thus, in conventional driving support techniques, whether or not to perform notification is determined according to the actual position of the preceding vehicle. Accordingly, notification will not be performed as long as a preceding vehicle is present between the subject vehicle and intersection, and the notification is performed at the timing when there is no preceding vehicle between the subject vehicle and intersection. According to the conventional driving support techniques, however, since another vehicle may have come very close to the subject vehicle at the timing of the notification, such notification may not be suitably performed in advance so that the driver can drive composedly.

SUMMARY OF THE INVENTION

The present invention has been made in view of such a situation, and a purpose thereof is to provide a technique for predicting, when a subject vehicle travels toward an intersection, the position of a preceding vehicle so as to determine whether or not to permit driving support processing.

To solve the problem above, a driving support device of an embodiment comprises: a subject vehicle information acquirer configured to acquire subject vehicle information including position information and behavior information of a subject vehicle traveling toward an intersection; an another vehicle information acquirer configured to acquire another vehicle information including position information and behavior information of another vehicle transmitted from the another vehicle via intervehicle acquirer configured to acquire preceding vehicle information including position information and behavior information of a preceding vehicle traveling in front of a subject vehicle; a support processor configured to perform driving support processing of outputting a warning when it is judged that communication; a preceding vehicle information there is a possibility of collision between a subject vehicle and another vehicle on the basis of subject vehicle information acquired by the subject vehicle information acquirer and another vehicle information acquired by the another vehicle information acquirer; a subject vehicle information predictor configured to predict an arrival time required until a subject vehicle arrives at 5 an intersection, on the basis of subject vehicle information acquired by the subject vehicle information acquirer; a preceding vehicle information predictor configured to predict the position of a preceding vehicle at the time when a predicted arrival time elapses, on the basis of preceding vehicle information acquired by the preceding vehicle information acquirer; and a support execution determiner configured to determine whether to permit or forbid the support processor to perform driving support processing, in accordance with a predicted position of a preceding vehicle.

According to the embodiment, the position of a preceding vehicle at the time when a subject vehicle arrives at an intersection is predicted, and whether to permit or forbid driving support processing is determined according to the predicted position of the preceding vehicle, so that execution of unnecessary driving support processing can be prevented.

The support execution determiner may permit the support processor to perform driving support processing when 25 a predicted position of a preceding vehicle is within or beyond an intersection, and the support execution determiner may forbid the support processor to perform driving support processing when a predicted position of a preceding vehicle is before an intersection. When the predicted position of the preceding vehicle is before the intersection, it is predicted that the subject vehicle may overtake the preceding vehicle; accordingly, by forbidding the support processor to perform driving support processing, execution of unnecessary driving support processing can be prevented.

The subject vehicle information predictor may predict the behavior of a subject vehicle at the time when a predicted arrival time elapses, on the basis of subject vehicle information acquired by the subject vehicle information acquirer, and the preceding vehicle information predictor may predict the position and behavior of a preceding vehicle at the time when a predicted arrival time elapses, on the basis of preceding vehicle information acquired by the preceding vehicle information acquirer. The driving support device may further comprise a following entering determiner configured to determine whether or not a subject vehicle travels close to a preceding vehicle in the same direction at an intersection, on the basis of the behavior of the subject vehicle predicted by the subject vehicle information predictor and the position and behavior of the preceding vehicle predicted by the preceding vehicle information predictor. The support execution determiner may permit the support processor to perform driving support processing when the following entering determiner judges that a subject vehicle travels close to a preceding vehicle in the same direction at an intersection.

When it is predicted that a subject vehicle travels close to a preceding vehicle to enter 5 an intersection and the subject vehicle and preceding vehicle travel in the same direction at the intersection, it may be suitable to permit the support processor to perform driving support processing, so as to appropriately output a warning.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
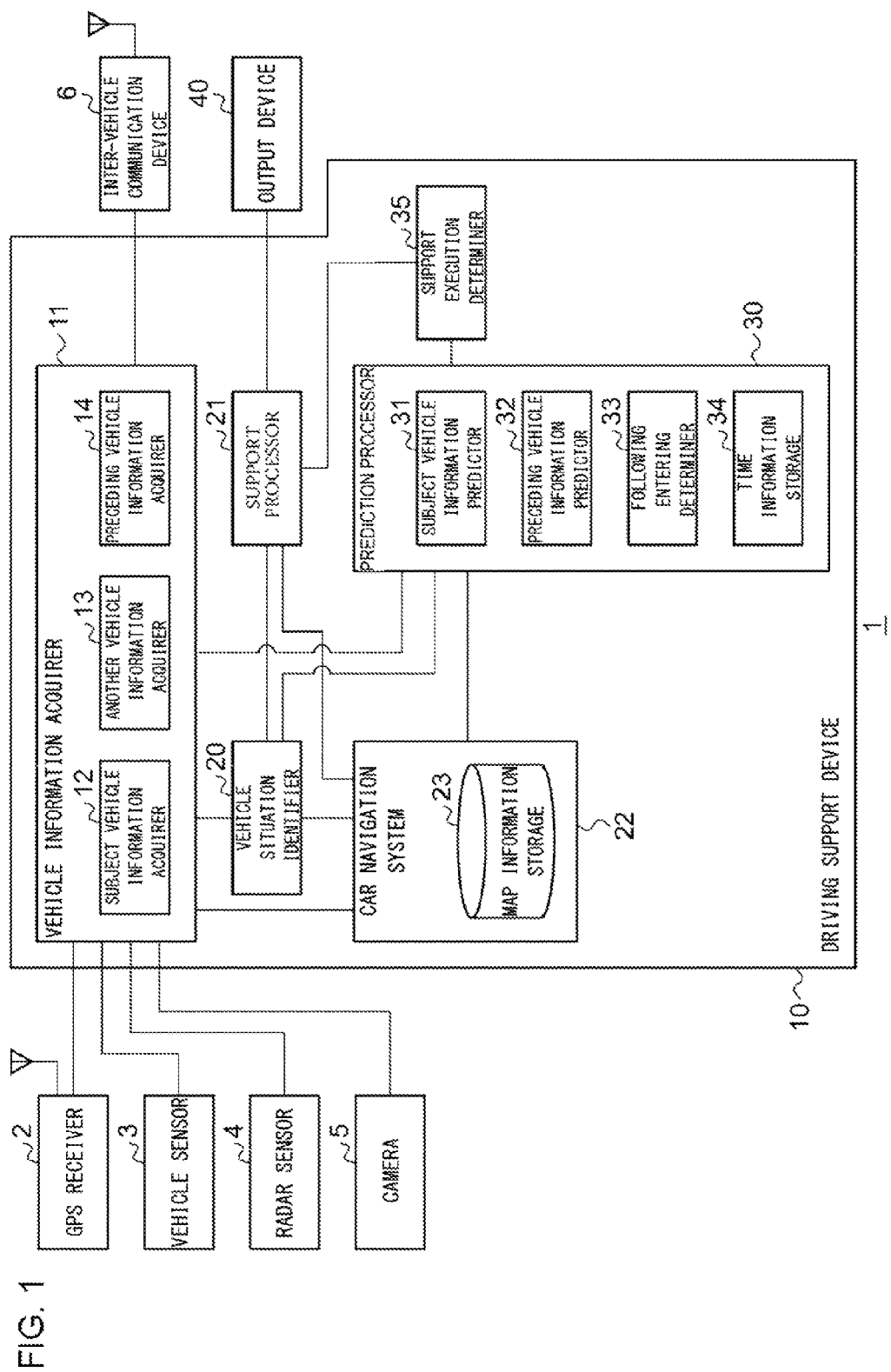
FIG. 1 is a diagram that shows a configuration of a vehicle system according to an embodiment.

FIG. 1 shows a configuration of a vehicle system 1 according to an embodiment. The vehicle system 1 comprises a global positioning system (GPS) receiver 2, a vehicle sensor 3, a radar sensor 4, a camera 5, an inter-vehicle communication device 6, a driving support device 10, and an output device 40. When a subject vehicle travels toward an intersection, the driving support device 10 performs driving support processing of outputting a warning from the output device 40 to the driver of the subject vehicle, upon judging that the subject vehicle may collide with another vehicle. The driving support device 10 comprises a vehicle information acquirer 11, a vehicle situation identifier 20, a support processor 21, a car navigation system 22, a prediction processor 30, and a support execution determiner 35.

The vehicle information acquirer 11 comprises a subject vehicle information acquirer 12 that acquires information of the subject vehicle, an another vehicle information acquirer 13 that acquires information of another vehicle, and a preceding vehicle information acquirer 14 that acquires information of a preceding vehicle. The prediction processor 30 comprises a subject vehicle information predictor 31 that predicts information of the subject vehicle, a preceding vehicle information predictor 32 that predicts information of a preceding vehicle, a following entering determiner 33 that determines if the subject vehicle and a preceding vehicle will exhibit similar behavior based on predicted subject vehicle information and predicted preceding vehicle information, and a time information storage 34 that stores time information used for prediction of vehicle behavior. The car navigation system 22 comprises a map information storage 23 and performs guidance about the current position of the subject vehicle or route guidance to a destination. The map information storage 23 stores map information including node data used to identify a node and link data for a link, which is a road section between nodes. The map information storage 23 also stores attribute information of a road connected to an intersection. The attribute information includes regulation information regarding a traffic sign placed along a road.

The driving support device 10 includes a computer, and each of various functions of the driving support device 10, which will be described later, can be implemented by a circuit block, a memory, an LSI or the like in terms of hardware, and by a memory-loaded program or the like in terms of software. Accordingly, it will be obvious to those skilled in the art that the various functions of the driving support device 10 may be implemented in a variety of forms by hardware only, software only, or a combination thereof, and the form is not limited to any of them.

The GPS receiver 2 receives, via a GPS antenna, GPS signals transmitted from multiple GPS satellites. The GPS receiver 2 detects the position of a traveling subject vehicle based on the received GPS signals. The GPS receiver 2 also calculates and obtains the latitude and longitude of the position of the subject vehicle and the bearing of the subject vehicle, so as to provide them to the subject vehicle information acquirer 12. The vehicle sensor 3 includes at least a wheel speed sensor for detecting the vehicle speed of the subject vehicle and may further include a gyro sensor, an acceleration sensor, a steering angle sensor, a turn signal sensor for detecting the operating state of the turn signal (direction indicator) lever, and an accelerator sensor for detecting the operating state of the accelerator. The vehicle sensor 3 provides information detected by each sensor to the subject vehicle information acquirer 12.

The subject vehicle information acquirer 12 acquires subject vehicle information including position information and behavior information of the subject vehicle traveling toward an intersection. The behavior information of the subject vehicle may include bearing information, which indicates the traveling direction of the subject vehicle, and speed information. The position information and bearing information of the subject vehicle may be provided from the GPS receiver 2 or may be calculated by the subject vehicle information acquirer 12 based on information detected by the gyro sensor, acceleration sensor, wheel speed sensor, or steering angle sensor in the vehicle sensor 3. Further, the subject vehicle information acquirer 12 acquires speed information of the subject vehicle from information detected by the wheel speed sensor and also acquires turn signal information, which indicates the direction to which the subject vehicle turns, from the turn signal sensor. In this way, the subject vehicle information acquirer 12 of the embodiment acquires behavior information including bearing information, speed information, and turn signal information, in addition to the position information of the subject vehicle. The subject vehicle information acquirer 12 acquires the subject vehicle information with a predetermined period and provides the acquired subject vehicle information to the inter-vehicle communication device 6 and the vehicle situation identifier 20.

The inter-vehicle communication device 6 performs inter-vehicle communication between the subject vehicle and another vehicle. Via an inter-vehicle communication antenna, the inter-vehicle communication device 6 transmits subject vehicle information acquired by the subject vehicle information acquirer 12 to a vehicle around the subject vehicle and receives another vehicle information transmitted from a vehicle around the subject vehicle. The another vehicle information includes position information and behavior information of another vehicle. The behavior information of another vehicle may include bearing information, which indicates the traveling direction of the another vehicle, and speed information. Also, the behavior information of another vehicle may include turn signal information of the another vehicle. The behavior information of another vehicle may further include navigation information, which is set in route guidance of a navigation system in the another vehicle. The navigation information includes information that indicates which roads to travel along and which intersections to turn at in route guidance to a destination. The navigation information need not necessarily include information of the route through to the final destination and has only to include, for example, information of a range within several kilometers of the current position. The inter-vehicle communication device 6 receives another vehicle information and provides it to the another vehicle information acquirer 13.

The another vehicle information acquirer 13 acquires, from the inter-vehicle communication device 6, another vehicle information including position information and behavior information of another vehicle. The another vehicle information acquirer 13 then provides the another vehicle information thus acquired to the vehicle situation identifier 20.

The radar sensor 4 is an autonomous sensor for detecting an object around the subject vehicle, and emits millimeter waveband radio waves and receives radio waves reflected by a target object so as to monitor a relative position (distance and angle) and a relative speed of the target object with respect to the subject vehicle. In the embodiment, the radar sensor 4 monitors a relative position and a relative speed of a preceding vehicle traveling in front of the subject vehicle. Information detected by the radar sensor 4 is provided to the preceding vehicle information acquirer 14. The preceding vehicle information acquirer 14 receives, from the radar sensor 4, detected information of a preceding vehicle traveling in front of the subject vehicle, so as to acquire relative position information and relative behavior information between the preceding vehicle and the subject vehicle. The relative position information includes the distance between the preceding vehicle and subject vehicle, and the relative behavior information includes a relative speed and a relative bearing between the preceding vehicle and subject vehicle.

The camera 5 captures an image of a region in front of the subject vehicle. An image captured by the camera 5 is provided to the preceding vehicle information acquirer 14. Accordingly, the preceding vehicle information acquirer 14 performs image analysis to identify a preceding vehicle included in the captured image and acquires relative position information and relative behavior information between the preceding vehicle and the subject vehicle.

Upon acquisition of relative position information and relative behavior information between the preceding vehicle and the subject vehicle, the preceding vehicle information acquirer 14 acquires, by calculation, preceding vehicle information including position information and behavior information of the preceding vehicle, based on the position information and behavior information of the subject vehicle. The preceding vehicle information acquirer 14 calculates position information of the preceding vehicle from the relative positions of the preceding vehicle and subject vehicle and the position of the subject vehicle. Also, the preceding vehicle information acquirer 14 calculates speed information of the preceding vehicle from the relative speeds of the preceding vehicle and subject vehicle and the speed of the subject vehicle, and calculates bearing information of the preceding vehicle from the relative bearings of the preceding vehicle and subject vehicle and the bearing of the subject vehicle. In this way, the preceding vehicle information acquirer 14 acquires preceding vehicle information including position information and behavior information of the preceding vehicle traveling in front of the subject vehicle. The preceding vehicle information acquirer 14 then provides the preceding vehicle information thus acquired to the vehicle situation identifier 20.

When the radar sensor 4 is not mounted on the subject vehicle, the preceding vehicle information acquirer 14 acquires preceding vehicle information based on an image captured by the camera 5. Also, when the camera 5 is not mounted on the subject vehicle, the preceding vehicle information acquirer 14 acquires preceding vehicle information based on information detected by the radar sensor 4. If both the radar sensor 4 and camera 5 are mounted on the subject vehicle, the preceding vehicle information acquirer 14 may acquire pieces of preceding vehicle information based on each of information detected by the radar sensor 4 and an image captured by the camera 5, so as to calculate more accurate preceding vehicle information using the pieces of preceding vehicle information.

When a preceding vehicle is provided with an inter-vehicle communication device, the preceding vehicle information acquirer 14 acquires, from the inter-vehicle communication device 6, preceding vehicle information including position information and behavior information of the preceding vehicle. Whether or not another vehicle information received by the inter-vehicle communication device 6 is information of the preceding vehicle is determined according to consistency between the position information and behavior information included in the another vehicle information and the position information and behavior information of the preceding vehicle calculated based on information detected by the radar sensor 4 or an image captured by the camera 5 or both. If the preceding vehicle information acquirer 14 acquires pieces of preceding vehicle information based on each of information detected by the radar sensor 4, an image captured by the camera 5, and information received by the inter-vehicle communication device 6, the preceding vehicle information acquirer 14 may calculate more accurate preceding vehicle information using the pieces of preceding vehicle information.

The map information storage 23 stores map information including node data used to identify a node and link data for a link, which is a road section between nodes. The node data includes a node number and position coordinates (latitude, longitude), and the link data includes a link number, a start node number, and an end node number. Node data for identifying an intersection node includes information indicating that it is an intersection. To an entering link of an intersection node is set, as attribute information, sign regulation information that includes at least information indicating whether or not the intersection requires a stop.

Based on the subject vehicle information acquired by the subject vehicle information acquirer 12, the vehicle situation identifier 20 identifies an intersection for which the subject vehicle is heading, using map information stored in the map information storage 23. Also, based on the position information of the subject vehicle acquired by the subject vehicle information acquirer 12, position information of another vehicle acquired by the another vehicle information acquirer 13, and position information of a preceding vehicle acquired by the preceding vehicle information acquirer 14, the vehicle situation identifier 20 identifies, using the map information, the positions of the subject vehicle, another vehicle, and preceding vehicle on the map at an intersection that the subject vehicle is to enter or around the intersection, i.e., the positions of the subject vehicle, another vehicle, and preceding vehicle on the links. Position information detected by a GPS receiver mounted on a vehicle includes an error from the actual position caused by influences of atmosphere, the ionosphere, and surrounding structures on GPS signals. Accordingly, since a position detected by a GPS receiver is technically shifted from the actual position on a link, the vehicle situation identifier 20 performs map matching processing so as to correct the position information of the subject vehicle acquired by the subject vehicle information acquirer 12, position information of another vehicle acquired by the another vehicle information acquirer 13, or position information of a preceding vehicle acquired by the preceding vehicle information acquirer 14, to a position on a link of the map.

The vehicle situation identifier 20 also identifies the moving direction and speed of the subject vehicle on a link and the moving direction and speed of another vehicle on a link, based on the bearing information and speed information of the subject vehicle and the bearing information and speed information of the another vehicle. Also, the vehicle situation identifier 20 can identify an intersection for which the subject vehicle is heading, based on the position and moving direction of the subject vehicle on the link. The vehicle situation identifier 20 may also identify the traveling direction of the subject vehicle at an intersection based on the turn signal information. The vehicle situation identifier 20 identifies, as a subject vehicle situation, the position, moving direction, and speed of the subject vehicle on a link, and the traveling direction of the subject vehicle at an intersection, and also identifies, as an another vehicle situation, the position, moving direction, and speed of another vehicle on a link, so as to provide them to the support processor 21.

When the support processor 21 judges that the subject vehicle may collide with another vehicle based on the subject vehicle information acquired by the subject vehicle information acquirer 12 and another vehicle information acquired by the another vehicle information acquirer 13, the support processor 21 performs driving support processing of outputting a warning. In the embodiment, the subject vehicle information and another vehicle information is converted by the vehicle situation identifier 20 to the subject vehicle situation and another vehicle situation as information on the map, and the support processor 21 performs driving support processing based on the subject vehicle situation and another vehicle situation identified by the vehicle situation identifier 20. The support processor 21 judges whether there is a possibility of collision between the subject vehicle and another vehicle, based on the position, moving direction, and speed of the subject vehicle on a link, and the position, moving direction, and speed of the another vehicle on a link.

Figure 2:
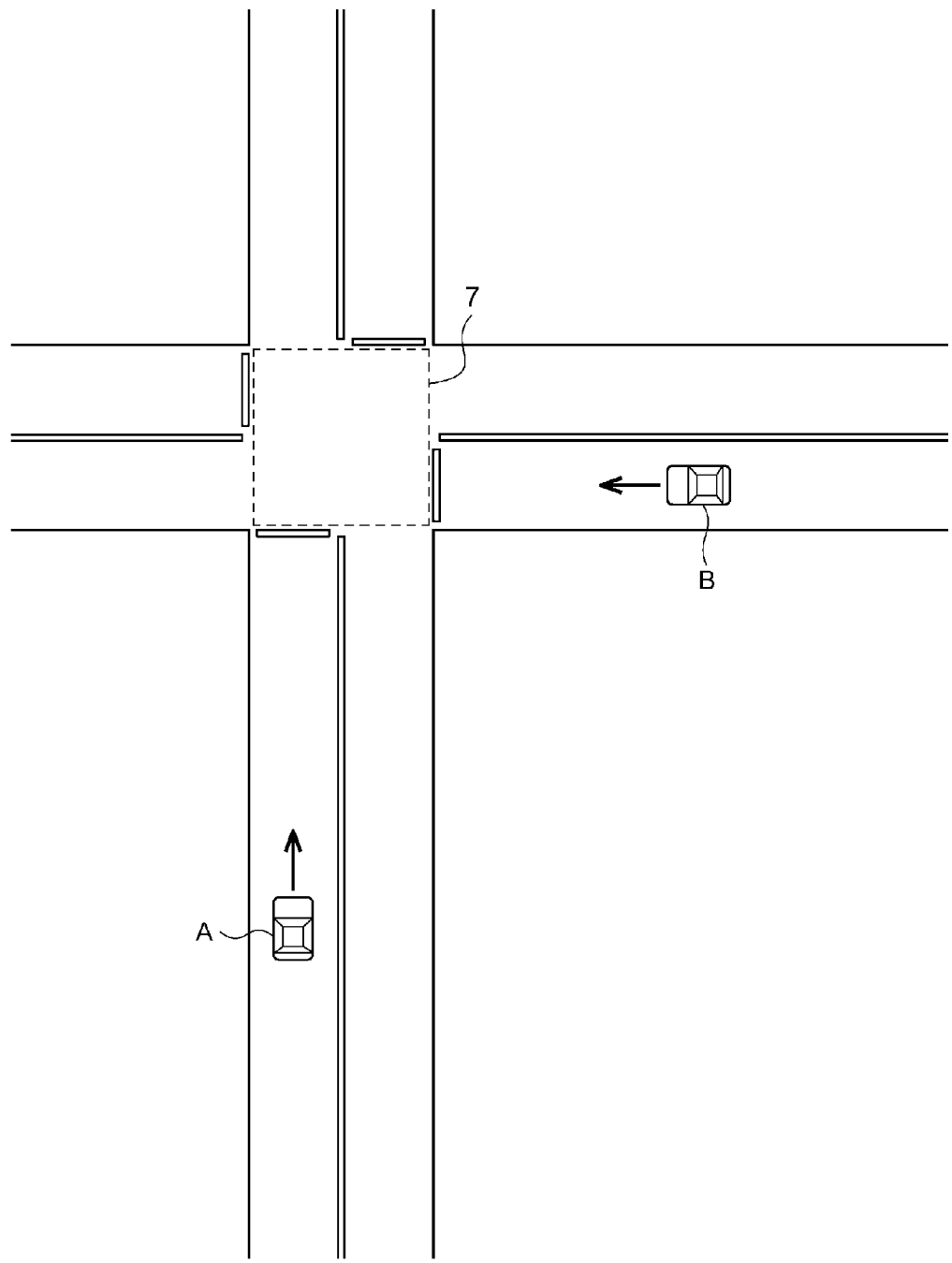
FIG. 2 is a diagram for describing driving support at an intersection according to the embodiment.

FIG. 2 is a diagram for describing driving support at an intersection according to the embodiment. In the example shown in FIG. 2, a subject vehicle A is traveling toward an intersection, and another vehicle B is also traveling toward the intersection on a road that is perpendicular to the road on which the subject vehicle A is traveling. The intersection is a place where the two roads intersect, and FIG. 2 shows the area of an intersection 7. In this example, the support processor 21 performs crossing collision prevention support.

Based on the vehicle situation (position, moving direction, and speed) of the subject vehicle A and the vehicle situation (position, moving direction, and speed) of the another vehicle B, when the support processor 21 judges that the another vehicle B will be passing through the intersection 7 at the time when the subject vehicle A arrives at the intersection, the support processor 21 judges that there is a possibility of collision.

Upon judging that there is a possibility of collision, the support processor 21 performs driving support processing of outputting a warning from the output device 40 to the driver of the subject vehicle A. The output device 40 may include a display device for outputting a warning screen and a sound output device for outputting a warning sound, and the support processor 21 allows one of or both the display device and the sound output device to output a warning, so as to alert the driver of the subject vehicle A to the another vehicle B. When judging that there is no possibility of collision between the subject vehicle and another vehicle, the support processor 21 does not arrange to output a warning.

In the example described above, the vehicle situation identifier 20 identifies, as the subject vehicle situation, the position, moving direction, and speed of the subject vehicle A on a link and also identifies, as the another vehicle situation, the position, moving direction, and speed of the another vehicle B on a link, based on the map information stored in the map information storage 23. In another example, instead of using the subject vehicle situation and another vehicle situation based on map matching processing, the support processor 21 may directly use the subject vehicle information acquired by the subject vehicle information acquirer 12 and the another vehicle information acquired by the another vehicle information acquirer 13 in order to judge the possibility of collision. In this case, map matching processing for the subject vehicle is performed so that the vehicle situation identifier 20 can identify the intersection 7 that the subject vehicle is to enter, but the support processor 21 does not use the subject vehicle situation based on the map matching processing to judge the possibility of collision.

In such a case, the vehicle situation identifier 20 directly provides, to the support processor 21, the subject vehicle information acquired by the subject vehicle information acquirer 12 and the another vehicle information acquired by the another vehicle information acquirer 13, and the support processor 21 then judges whether there is a possibility of collision between the subject vehicle and the another vehicle based on the subject vehicle information and another vehicle information. The judgement is performed based on the position information, bearing information, and speed information included in the subject vehicle information, and the position information, bearing information, and speed information included in the another vehicle information. According to this judgement process, the possibility of collision on a two-dimensional plane is judged based on the subject vehicle information and another vehicle information, regardless of map information. Since the result of map matching processing is not used, this judgement process has the advantage of reducing the computational amount.

Figure 3:
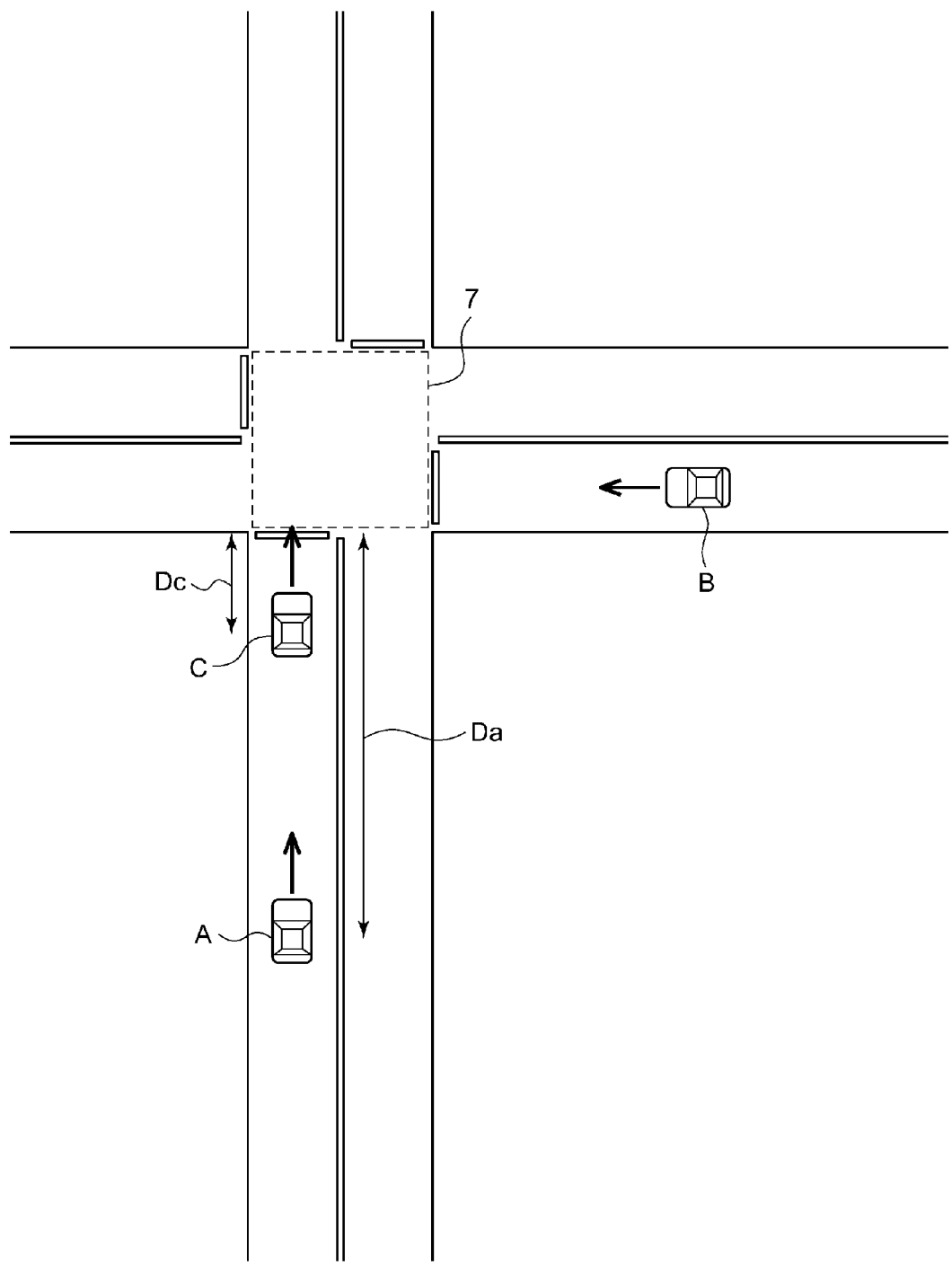
FIG. 3 is a diagram that shows an example of vehicle situations in the embodiment.

FIG. 3 shows an example of vehicle situations in the embodiment. In the example shown in FIG. 3, the subject vehicle A is traveling toward the intersection 7, and another vehicle B is also traveling toward the intersection 7 on a road that is perpendicular to the road on which the subject vehicle A is traveling. Further, a preceding vehicle C is also traveling toward the intersection 7 in front of the subject vehicle A on the same road on which the subject vehicle A is traveling. When there is a possibility of crossing collision between the subject vehicle A and the another vehicle B, the driving support device 10 predicts the position of the preceding vehicle C at the time when the subject vehicle A arrives in the vicinity of the intersection so as to determine whether to permit or forbid the driving support processing of outputting a warning to the driver.

Referring back to FIG. 1, the subject vehicle information predictor 31 in the prediction processor 30 predicts an arrival time required until the subject vehicle A arrives in the vicinity of the intersection, based on the subject vehicle information acquired by the subject vehicle information acquirer 12. For example, when the distance between the position of the subject vehicle A and the vicinity of the intersection is Da (km) and the speed of the subject vehicle A is Sa (km/h), the subject vehicle information predictor 31 predicts that the arrival time required until the subject vehicle A arrives at the intersection 7 will be Da/Sa (h). The prediction by the prediction processor 30 may be performed when, for example, Da=0.1-0.2 kilometers, i.e., when the distance from the intersection 7 is 100 meters or greater. It is also assumed that the distance between the position of the preceding vehicle C and the vicinity of the intersection is Dc (km).

Based on the preceding vehicle information acquired by the preceding vehicle information acquirer 14, the preceding vehicle information predictor 32 predicts the position of the preceding vehicle C at the time when the arrival time predicted by the subject vehicle information predictor 31 elapses. According to the predicted position of the preceding vehicle C at the time when the subject vehicle A arrives at the intersection, the support execution determiner 35 determines whether to permit or forbid the support processor 21 to perform driving support processing. When there is no preceding vehicle traveling in front of the subject vehicle A, the support execution determiner 35 permits the support processor 21 to perform driving support processing.

Figure 4:
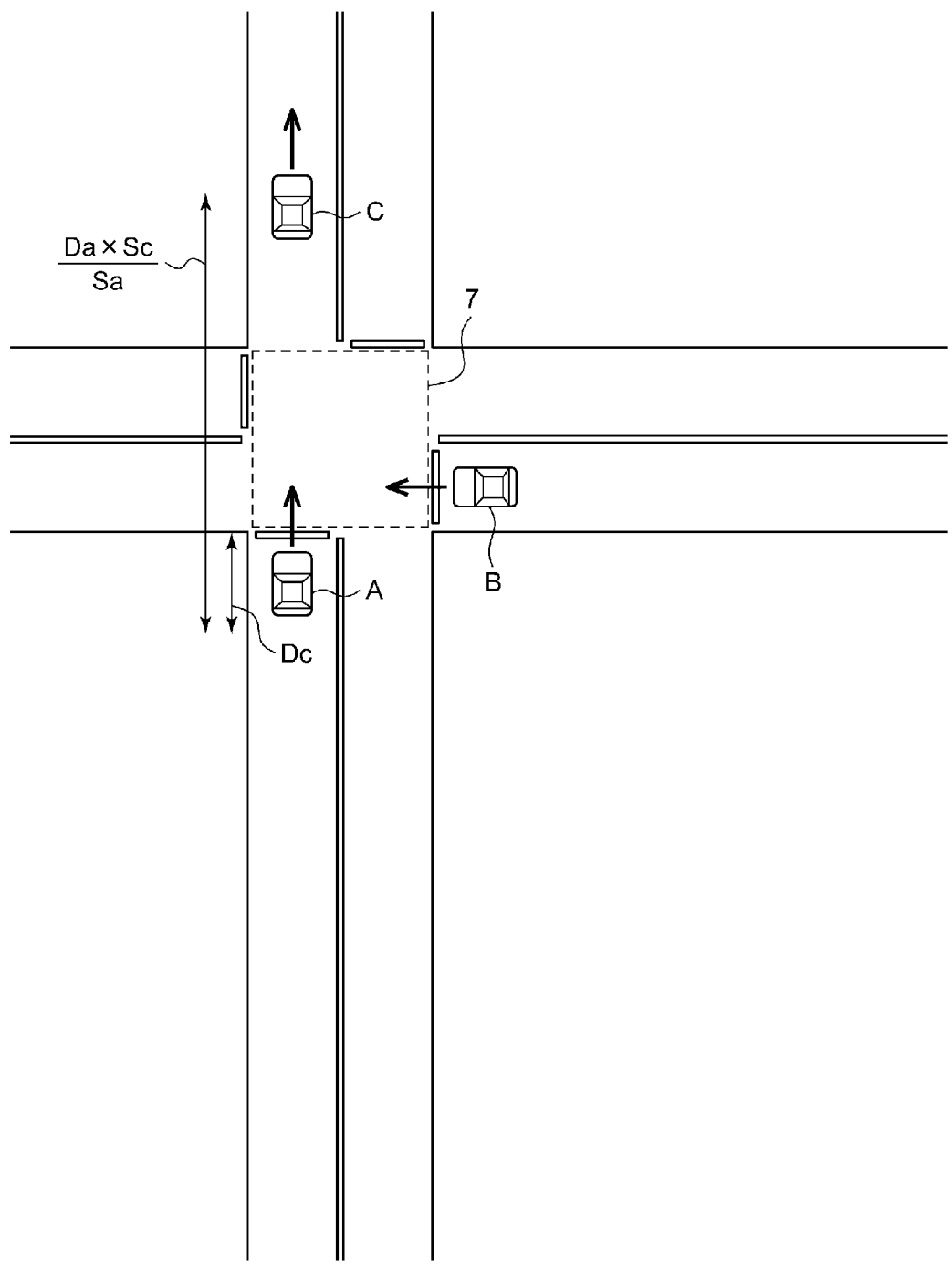
FIG. 4 is a diagram that shows an example of a prediction result provided by a prediction processor.

FIG. 4 shows an example of a prediction result provided by the prediction processor 30. When the arrival time required until the subject vehicle A arrives at the intersection 7 is predicted as Da/Sa (h) and the speed of the preceding vehicle C is Sc (km/h), the preceding vehicle information predictor 32 predicts that the preceding vehicle C will be traveling (Da×Sc/Sa) kilometers ahead of the position that is Dc kilometers before the intersection. It is assumed here that regulation information requiring a stop is not provided on the road on which the subject vehicle A and preceding vehicle C are traveling. The preceding vehicle information predictor 32 then notifies the support execution determiner 35 of the predicted position of the preceding vehicle C.

The support execution determiner 35 judges whether or not the position (Da×Sc/Sa) kilometers ahead of the position that is Dc kilometers before the intersection is located within the intersection or beyond the intersection. The position beyond the intersection means a position of a vehicle that has passed through the intersection 7. When the predicted position of the preceding vehicle C is within or beyond the intersection, as shown in FIG. 4, for example, the support execution determiner 35 permits the support processor 21 to perform driving support processing. In this example, since it is predicted that the preceding vehicle C will have already passed through and exited from the intersection 7 at the time when the subject vehicle A arrives in the vicinity of the intersection, the support execution determiner 35 permits processing for crossing collision prevention support. Accordingly, the support processor 21 can allow the output device 40 to output a warning to the driver.

According to the embodiment, the position of the preceding vehicle C at the time when the subject vehicle A arrives at the intersection is predicted, and when it is judged that the predicted position of the preceding vehicle C is within or beyond the intersection, the support processor 21 can allow the output device 40 to output a warning at the timing. Accordingly, even if the preceding vehicle C has not enter the intersection at the timing when a warning is output, the preceding vehicle C will have exited from the intersection at the timing when the subject vehicle A arrives at the intersection, so that the driver can recognize the necessity of paying attention to the another vehicle B.

Meanwhile, when the support execution determiner 35 judges that the position (Da×Sc/Sa) kilometers ahead of the position that is Dc kilometers before the intersection is located before the intersection, the support execution determiner 35 forbids the support processor 21 to perform driving support processing. The position before the intersection means a position of a vehicle that has not arrived at the intersection 7 yet. For example, if the speed Sc (km/h) of the preceding vehicle C is lower than the speed Sa (km/h) of the subject vehicle A, the subject vehicle A may overtake the preceding vehicle C before the intersection 7. In such a case, it is predicted that the subject vehicle A will reduce the speed from Sa (km/h) and the driver will be fully alert. Accordingly, the support execution determiner 35 forbids the support processor 21 to perform driving support processing, so as not to output an unnecessary warning.

In this way, the driving support device 10 predicts the positional relationship between the preceding vehicle C and the intersection 7 at predicted timing at which the subject vehicle A will arrive at the intersection 7, so as to determine whether or not to perform driving support processing of outputting a warning against the another vehicle B. As stated above, when it is predicted that the preceding vehicle C will have exited from the intersection 7, a warning can be output at the time when the preceding vehicle C is positioned before the intersection 7, so that the driver can composedly recognize the presence of the another vehicle B.

Figure 5:
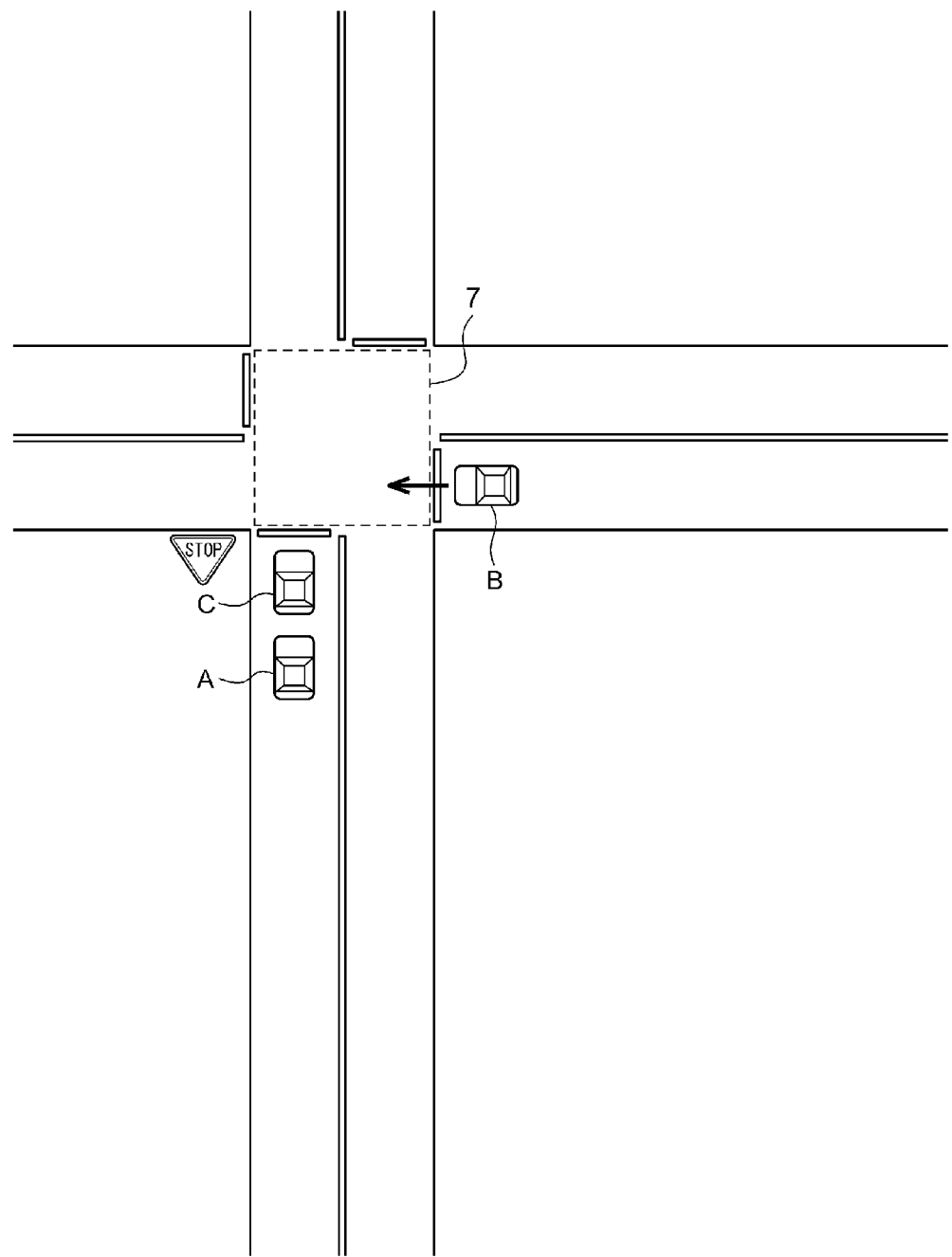
FIG. 5 is a diagram that shows another example of a prediction result provided by the prediction processor.

FIG. 5 shows another example of a prediction result provided by the prediction processor 30. Although it is assumed that regulation information requiring a stop is not provided on the road on which the subject vehicle A and preceding vehicle C are traveling in the prediction result example shown in FIG. 4, it is assumed that regulation information requiring a stop is provided in the prediction result example shown in FIG. 5.

The subject vehicle information predictor 31 and the preceding vehicle information predictor 32 acquire, from the map information storage 23, regulation information requiring a stop and predict that the subject vehicle A and the preceding vehicle C will stop at the stop line of the intersection 7, respectively. Meanwhile, the time information storage 34 stores, as a table, a relationship among a traveling speed of a vehicle, a distance between the vehicle and an intersection when the vehicle starts to reduce the speed, and a normal time from when the vehicle starts to reduce the speed until the vehicle stops at the intersection. Accordingly, the subject vehicle information predictor 31 refers to the table to predict the arrival time required until the subject vehicle A arrives in the vicinity of the intersection (the stop line), based on the position information and speed information of the subject vehicle A.

For example, the time information storage 34 stores a correspondence relationship among a vehicle speed Sa (km/ h), a distance Dt from an intersection when the vehicle starts to reduce the speed, and a time Tt from when the vehicle starts to reduce the speed until the vehicle stops at the intersection. In this case, the subject vehicle information predictor 31 calculates an arrival time Ta required until the subject vehicle A arrives at the intersection, using the following formula:

$$Ta = \text{(time until the vehicle starts to reduce the speed)} + \text{(time from when the vehicle starts to reduce the speed until the vehicle stops)}$$

wherein (time until the vehicle starts to reduce the speed)=(Da−Dt)/Sa, and (time from when the vehicle starts to reduce the speed until the vehicle stops)=Tt Accordingly, the arrival time Ta can be calculated by $$Ta = (Da-Dt)/Sa + Tt.$$

Based on the preceding vehicle information acquired by the preceding vehicle information acquirer 14, the preceding vehicle information predictor 32 predicts the position of the preceding vehicle C at the time when the predicted arrival time Ta elapses. The preceding vehicle information predictor 32 predicts whether the position of the preceding vehicle C at the time when the arrival time Ta elapses will be located before the intersection 7 or within or beyond the intersection 7. The time information storage 34 also stores a normal stop time Td required at a stop line. The normal stop time Td is a time from when a vehicle stops at a stop line until the vehicle starts to move, and may be set to 3 seconds, for example.

As with the subject vehicle information predictor 31, the preceding vehicle information predictor 32 refers to the table to predict the arrival time required until the preceding vehicle C arrives in the vicinity of the intersection (the stop line). It is assumed here that the predicted arrival time is Tc. Accordingly, the preceding vehicle information predictor 32 predicts that the time from when the preceding vehicle C crosses the stop line until the preceding vehicle C enters the intersection 7 will be (Tc+Td).

When Ta>(Tc+Td), the preceding vehicle information predictor 32 predicts that, at the time when the time Ta elapses, the preceding vehicle C will have started from the stop line of the intersection 7 and will be positioned within or beyond the intersection. Accordingly, the preceding vehicle information predictor 32 notifies the support execution determiner 35 of the prediction result, and the support execution determiner 35 permits the support processor 21 to perform driving support processing.

When Ta≤(Tc+Td), on the other hand, the preceding vehicle information predictor 32 predicts that, at the time when the time Ta elapses, the preceding vehicle C will be positioned before the intersection 7, or before the stop line. FIG. 5 shows an example of such a prediction result. Accordingly, the preceding vehicle information predictor 32 notifies the support execution determiner 35 of the prediction result, and the support execution determiner 35 forbids the support processor 21 to perform driving support processing.

Thus, when a stop is required before the intersection 7 that the subject vehicle A and the preceding vehicle C are to enter, the subject vehicle information predictor 31 and the preceding vehicle information predictor 32 refer to the table stored in the time information storage 34 to predict the behavior of the subject vehicle A and preceding vehicle C, respectively. Accordingly, when it is predicted that the preceding vehicle C will have started from the stop line at the time when the subject vehicle A arrives at the stop line, a warning is promptly output to alert the driver, and, when it is predicted that the preceding vehicle C will be positioned before the stop line, output of a warning is forbidden.

Figure 6:
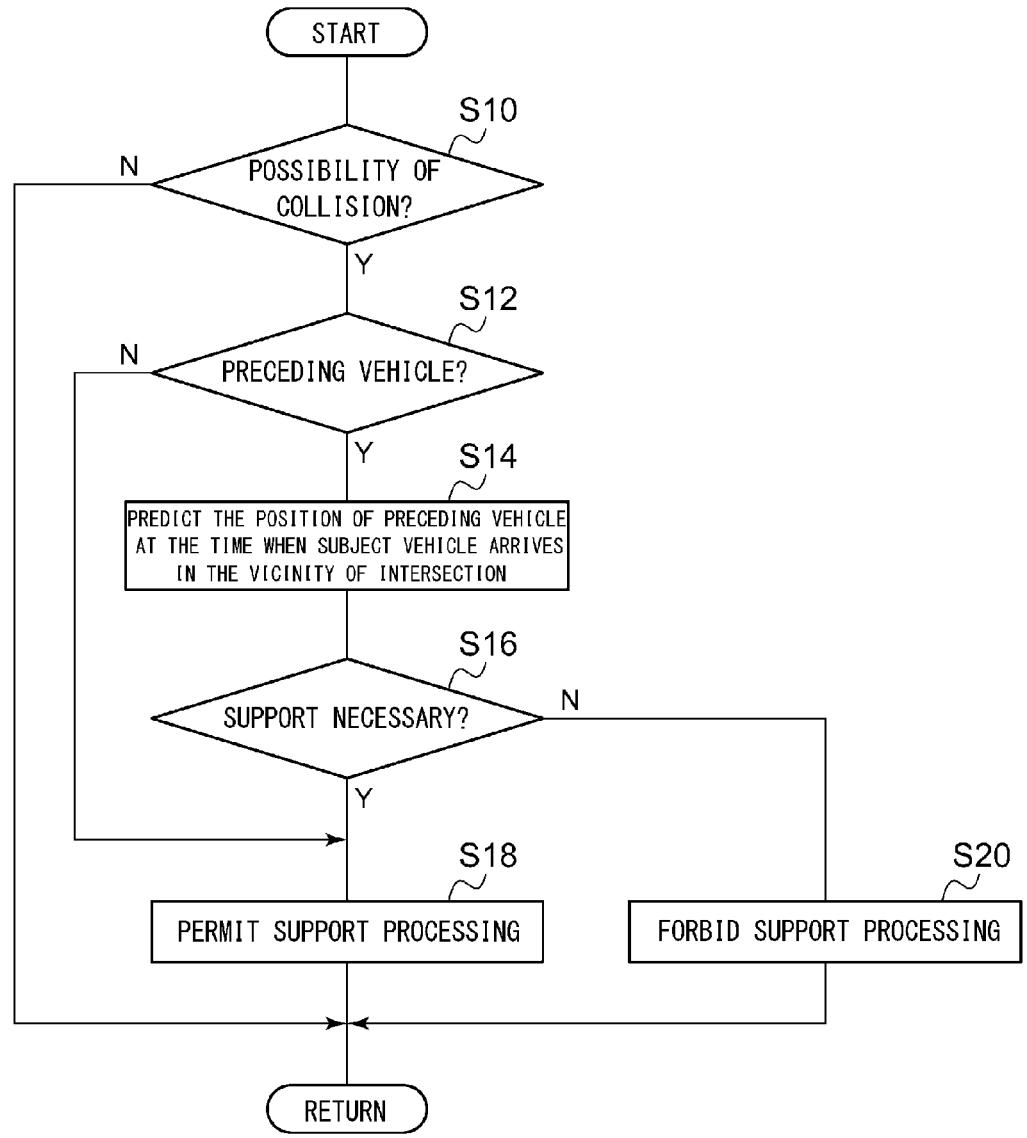
FIG. 6 is a flowchart of processing for determining execution of driving support processing in the embodiment.

FIG. 6 is a flowchart of processing for determining execution of driving support processing in the embodiment. Based on the subject vehicle information acquired by the subject vehicle information acquirer 12 and the another vehicle information acquired by the another vehicle information acquirer 13, the support processor 21 judges whether there is a possibility of collision between the subject vehicle and the another vehicle (S10). When there is no possibility of collision (N at S10), driving support processing is not performed. When it is judged that there is a possibility of collision between the subject vehicle and the another vehicle (Y at S10) and when no preceding vehicle is present between the subject vehicle and the intersection (N at S12), the support execution determiner 35 permits the support processor 21 to perform driving support processing (S18).

When a preceding vehicle is present in front of the subject vehicle (Y at S12), the preceding vehicle information predictor 32 predicts the position of the preceding vehicle at the time when the subject vehicle arrives in the vicinity of the intersection (S14). When the predicted position of the preceding vehicle is within or beyond the intersection, the support execution determiner 35 judges that driving support is necessary (Y at S16) and permits the support processor 21 to perform driving support processing (S18). When the predicted position of the preceding vehicle is before the intersection, on the other hand, the support execution determiner 35 judges that driving support is unnecessary (N at S16) and forbids the support processor 21 to perform driving support processing (S20). The embodiment relates to driving support at a position away from the intersection, and the step S20 means forbidding preliminary notice processing performed according to the prediction result at a position away from the intersection (position 100 meters away from the intersection, for example). Accordingly, even though such preliminary notice processing is forbidden in the step S20, if it is judged near the intersection that there is a possibility of collision based on the actual vehicle situations, for example, output of a warning at the time will not be forbidden.

The present invention has been described with reference to the embodiment. The embodiment is intended to be illustrative only, and it will be obvious to those skilled in the art that various combinations of constituting elements or processes could be developed and that such combinations also fall within the scope of the present invention. In the embodiment, it is not assumed that another vehicle prevents the preceding vehicle C entering the intersection. However, when it can be found that the preceding vehicle C cannot enter the intersection by the presence of another vehicle according to the another vehicle situation identified by the vehicle situation identifier 20, for example, the preceding vehicle information predictor 32 may suitably predict the behavior of the preceding vehicle in consideration of waiting time for which the preceding vehicle waits for the another vehicle to move.

As a modification, there will be described a technique in which driving support processing is permitted when it is predicted that the subject vehicle and the preceding vehicle are present close to each other and travel without a stop before an intersection, the subject vehicle follows the preceding vehicle to enter the intersection, and the vehicles travel in the same direction. Although it is assumed in the modification that the subject vehicle and preceding vehicle turn right at an intersection, the operation is not limited to the case of turning right.

When there is a preceding vehicle stopping before or within an intersection and when the subject vehicle is stopping after the preceding vehicle and waiting to turn right, for example, it can be considered that the driver pays sufficient attention to the circumstances. If a warning is output in such a situation, the driver may be annoyed by the output warning, so that the support execution determiner 35 may suitably forbid the support processor 21 to perform driving support processing.

However, when the preceding vehicle enters an intersection without a stop and turns right at the intersection and the subject vehicle follows the preceding vehicle to turn right, the driver may be sometimes unable to pay enough attention to another vehicle traveling on an opposite traffic lane. Hereinafter, the behavior of the subject vehicle entering an intersection close to and together with the preceding vehicle will be referred to as "following entering". Especially, when the preceding vehicle is a truck or another large-sized vehicle, the driver may be sometimes unable to carefully check an oncoming vehicle when turning right. Accordingly, it may be suitable that the support execution determiner 35 permits the driving support processing and, when there is a possibility of collision with an oncoming vehicle, the support processor 21 allows the output device 40 to output a warning. In the modification, driving support in such a case will be described.

Figure 7:
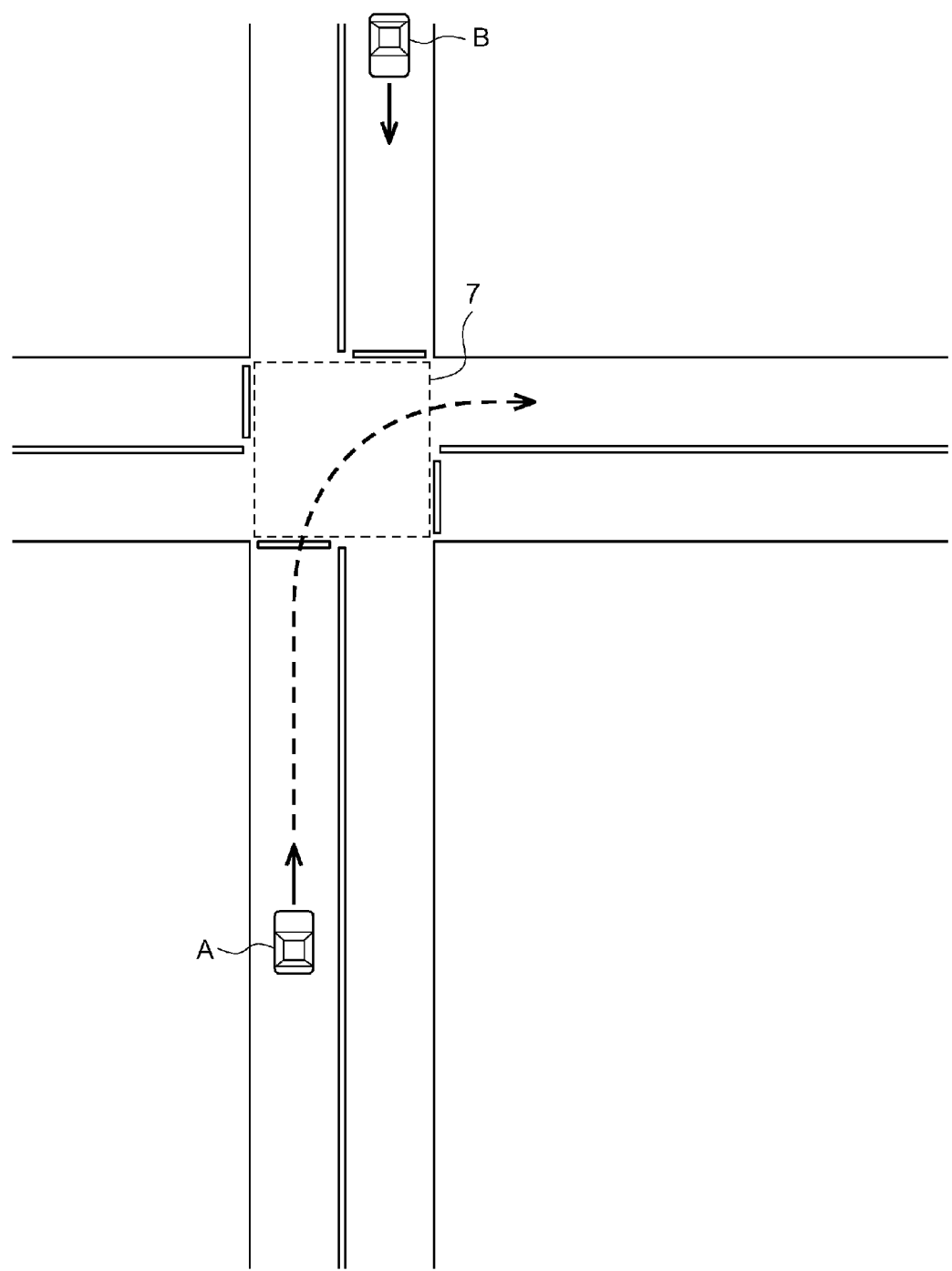
FIG. 7 is a diagram for describing driving support at an intersection according to a modification.

FIG. 7 is a diagram for describing driving support at an intersection according to the modification. In the example shown in FIG. 7, a subject vehicle A is traveling toward the intersection 7, and another vehicle B is also traveling toward the intersection 7 on an opposite traffic lane. In this modification, the support processor 21 performs right-turn collision prevention support. Based on the vehicle situation (position, moving direction, speed, and right turn information) of the subject vehicle A and the vehicle situation (position, moving direction, and speed) of the another vehicle B, when the support processor 21 judges that the another vehicle B will be passing through the intersection at the time when the subject vehicle A turns right at the intersection, the support processor 21 judges that there is a possibility of collision.

The subject vehicle information acquirer 12 may acquire the information indicating that the subject vehicle A will turn right at the intersection 7 (right turn information) from the information detected by the turn signal sensor or from the car navigation system 22. The car navigation system 22 performs route guidance to a destination that has been entered. Accordingly, since the car navigation system 22 comprehends that the subject vehicle A will turn right at the intersection 7, the subject vehicle information acquirer 12 may acquire the navigation information from the car navigation system 22 to acquire the information indicating that the subject vehicle A will turn right at the intersection 7. While the turn signal lever is operated near the intersection 7, the subject vehicle information acquirer 12 can acquire the navigation information at a position away from the intersection 7; accordingly, for the right-turn collision prevention support performed by the support processor 21, it would be suitable to use the right turn information acquired from the navigation information.

Upon judging that there is a possibility of collision, the support processor 21 performs driving support processing of outputting a warning from the output device 40 to the driver of the subject vehicle A. Outputting a warning from the output device 40 alerts the driver of the subject vehicle A to the another vehicle B. When judging that there is no possibility of collision between the subject vehicle A and another vehicle B, the support processor 21 does not arrange to output a warning.

Figure 8:
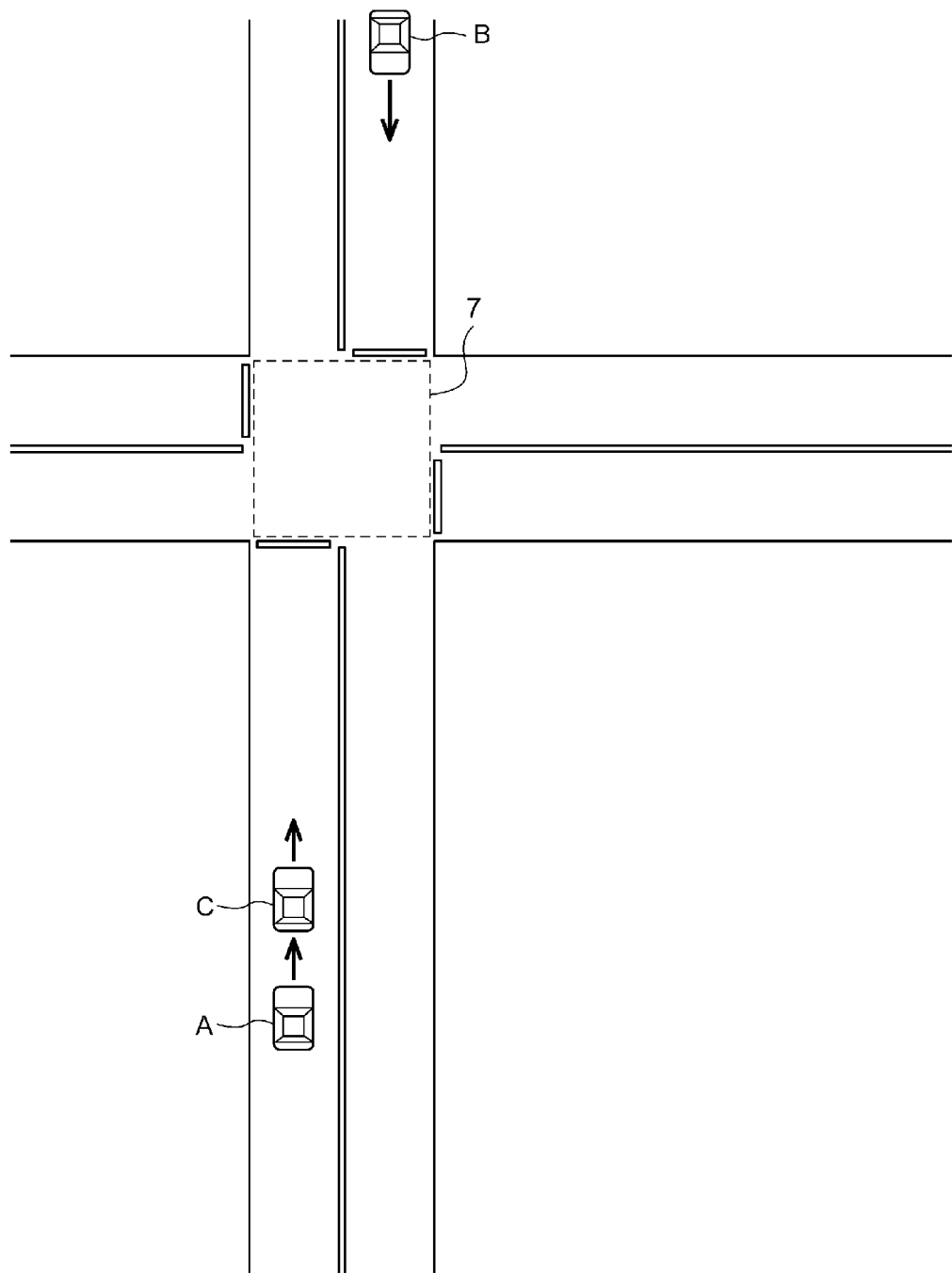
FIG. 8 is a diagram that shows an example of vehicle situations in the modification.

FIG. 8 shows an example of vehicle situations in the modification. In the example shown in FIG. 8, the subject vehicle A is traveling toward the intersection 7, and another vehicle B is also traveling toward the intersection 7 on an opposite traffic lane. Further, a preceding vehicle C is also traveling toward the intersection 7 in front of the subject vehicle A on the same road on which the subject vehicle A is traveling. When there is a possibility of right-turn collision between the subject vehicle A and the another vehicle B, the driving support device 10 predicts the position and behavior of the preceding vehicle C at the time when the subject vehicle A arrives in the vicinity of the intersection 7 so as to determine whether to permit or forbid the driving support processing of outputting a warning to the driver.

Referring back to FIG. 1, the subject vehicle information predictor 31 in the prediction processor 30 predicts an arrival time required until the subject vehicle A arrives in the vicinity of the intersection 7 based on the subject vehicle information acquired by the subject vehicle information acquirer 12, and also predicts the behavior of the subject vehicle A at the intersection 7 at the time when the predicted arrival time elapses. The behavior to be predicted includes the traveling direction and speed of the subject vehicle A at the intersection 7. At the time, the subject vehicle information predictor 31 may refer to the history of the speed of the subject vehicle A up to the present to consider whether the subject vehicle A tends to increase or decrease the speed, so as to predict the arrival time required until the subject vehicle A arrives in the vicinity of the intersection 7 and the speed of the subject vehicle A at the intersection 7. In the modification, the subject vehicle information predictor 31 predicts an arrival time Tk required until the subject vehicle A arrives at the intersection 7 and also predicts that the subject vehicle A will turn right at the intersection 7.

Based on the preceding vehicle information acquired by the preceding vehicle information acquirer 14, the preceding vehicle information predictor 32 predicts the position and behavior of the preceding vehicle C at the time when the arrival time Tk predicted by the subject vehicle information predictor 31 elapses. At the time, the preceding vehicle information predictor 32 may refer to the history of the speed of the preceding vehicle C up to the present to consider whether the preceding vehicle C tends to increase or decrease the speed, so as to predict the position and behavior of the preceding vehicle C at the time when the time Tk elapses. The behavior to be predicted includes the traveling direction and speed of the preceding vehicle C.

In the modification, the preceding vehicle information acquirer 14 acquires, as the preceding vehicle information, information regarding the traveling direction of the preceding vehicle C at the intersection. For example, the preceding vehicle information acquirer 14 may acquire the information regarding the traveling direction at the intersection by detecting the flashing states of the turn signals from an image captured by the camera 5. Also, the preceding vehicle information acquirer 14 may acquire preceding vehicle information including navigation information of the preceding vehicle C from the inter-vehicle communication device 6. The navigation information includes at least information regarding the traveling direction of the preceding vehicle C at the intersection 7 that the preceding vehicle C is to enter. In the following, it is assumed that the navigation information includes information indicating that the preceding vehicle C turns right at the intersection 7.

The preceding vehicle information predictor 32 predicts the position and behavior of the preceding vehicle C at the time when the time Tk elapses. As described in the embodiment, when the predicted position of the preceding vehicle C is beyond the intersection, the support execution determiner 35 permits the support processor 21 to perform driving support processing.

Based on the behavior of the subject vehicle A predicted by the subject vehicle information predictor 31 and the position and behavior of the preceding vehicle C predicted by the preceding vehicle information predictor 32, the following entering determiner 33 determines whether or not the subject vehicle A will travel close to the preceding vehicle C in the same direction at the intersection 7. Namely, the following entering determiner 33 determines whether or not the subject vehicle A will perform following entering into the intersection 7 after the preceding vehicle C, based on the predicted information. As stated previously, the following entering is the behavior of the subject vehicle A entering the intersection 7 close to and together with the preceding vehicle C while the subject vehicle A and preceding vehicle C do not stop at the intersection 7.

Upon acquisition, from the map information storage 23, of regulation information requiring a stop at the intersection 7 that the subject vehicle A is to enter, the following entering determiner 33 judges that the subject vehicle A will not perform following entering into the intersection 7. This is because, when regulation information requiring a stop is provided, it is predicted that both the subject vehicle A and preceding vehicle C will stop before the intersection. Similarly, the following entering determiner 33 may judge that the subject vehicle A will not perform following entering also when the following entering determiner 33 acquires, from a road-vehicle communication device, information indicating that the traffic light at the intersection is red at predicted timing at which the subject vehicle A or preceding vehicle C will arrive at the intersection, for example.

The following entering determiner 33 compares the position of the preceding vehicle C at the time when the time Tk predicted by the preceding vehicle information predictor 32 elapses, with the position of the subject vehicle A, so as to determine whether or not the distance between the preceding vehicle C and the subject vehicle A falls within a predetermined distance. When it falls within the predetermined distance, the following entering determiner 33 predicts that the subject vehicle A will be present close to the preceding vehicle C when the subject vehicle A arrives at the intersection. Also, the following entering determiner 33 compares the traveling directions of the subject vehicle A and preceding vehicle C at the time when the time Tk elapses, so as to determine whether or not the traveling directions are the same. In this example, since it is predicted that the both vehicles will turn right at the intersection 7, the following entering determiner 33 judges that the subject vehicle A and preceding vehicle C will travel in the same direction. Accordingly, the following entering determiner 33 judges that the subject vehicle A will travel close to the preceding vehicle C in the same direction at the intersection 7, i.e., that the subject vehicle A will perform following entering. The following entering determiner 33 then notifies the support execution determiner 35 of the judgment result.

When the following entering determiner 33 judges that the subject vehicle A will travel close to the preceding vehicle C in the same direction at the intersection 7, the support execution determiner 35 permits the support processor 21 to perform driving support processing. Accordingly, when the subject vehicle A follows the preceding vehicle C to enter the intersection 7 and travels in the same direction (turning right), the output device 40 outputs a warning to alert the driver of the subject vehicle A to the another vehicle B. Therefore, when entering the intersection, the driver can recognize the presence of the another vehicle B, which may be difficult to see behind the preceding vehicle C.

Figure 9:
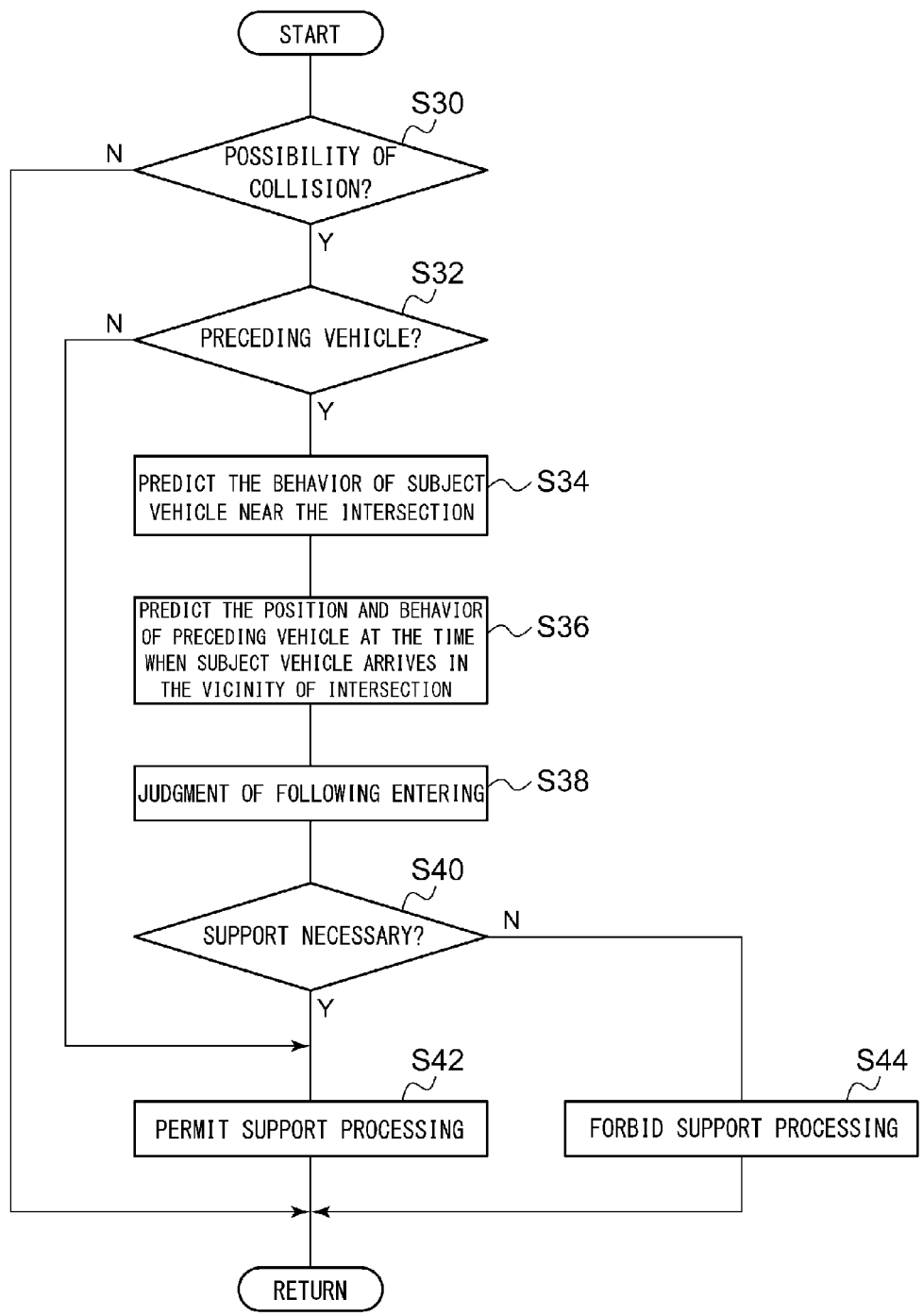
FIG. 9 is a flowchart of processing for determining execution of driving support processing in the modification.

FIG. 9 is a flowchart of processing for determining execution of driving support processing in the modification. Based on the subject vehicle information acquired by the subject vehicle information acquirer 12 and the another vehicle information acquired by the another vehicle information acquirer 13, the support processor 21 judges whether there is a possibility of collision between the subject vehicle and the another vehicle (S30). When there is no possibility of collision (N at S30), driving support processing is not performed. When it is judged that there is a possibility of collision between the subject vehicle and the another vehicle (Y at S30) and when no preceding vehicle is present between the subject vehicle and the intersection (N at S32), the support execution determiner 35 permits the support processor 21 to perform driving support processing (S42).

When a preceding vehicle is present in front of the subject vehicle (Y at S32), the subject vehicle information predictor 31 predicts an arrival time required until the subject vehicle arrives in the vicinity of the intersection and also predicts the behavior of the subject vehicle at the intersection (S34). Also, the preceding vehicle information predictor 32 predicts the position and behavior of the preceding vehicle at the time when the subject vehicle arrives in the vicinity of the intersection (S36). The following entering determiner 33 compares the positions of the subject vehicle and the preceding vehicle at the time when the arrival time elapses and also compares the behavior of the subject vehicle and the behavior of the preceding vehicle at the time, so as to judge whether or not the subject vehicle will travel close to the preceding vehicle in the same direction at the intersection and generate a judgment result (S38). The judgment result is conveyed to the support execution determiner 35.

When it is judged that the subject vehicle will perform following entering, the support execution determiner 35 judges that driving support is necessary (Y at S40) and permits the support processor 21 to perform driving support processing (S42). When it is judged that the subject vehicle will not perform following entering, on the other hand, the support execution determiner 35 judges that driving support is unnecessary (N at S40) and forbids the support processor 21 to perform driving support processing (S44). The modification relates to driving support at a position away from the intersection, and the step S44 means forbidding preliminary notice processing performed according to the prediction result at a position away from the intersection (position 100 meters away from the intersection, for example). Accordingly, even though such preliminary notice processing is forbidden in the step S44, if it is judged near the intersection that there is a possibility of collision based on the actual vehicle situations, for example, output of a warning at the time will not be forbidden. Thus, according to the modification, when it is predicted that the subject vehicle will follow the preceding vehicle to turn right at the intersection, a warning can be output from the output device 40.

The above example describes the case where the following entering determiner 33 determines whether or not the subject vehicle A will perform following entering, based on the prediction results at the time when the subject vehicle A arrives at the intersection provided by the subject vehicle information predictor 31 and preceding vehicle information predictor 32. The following entering determiner 33 may determine whether or not the subject vehicle A will perform following entering based on the speed of the subject vehicle A and the speed of the preceding vehicle C at the predicted time, for example. When the speed of the preceding vehicle C is faster than the speed of the subject vehicle A, for example, it is at least predicted that the distance between the preceding vehicle C and the subject vehicle A will be greater at the intersection, so that the following entering determiner 33 may judge that the subject vehicle A will not perform following entering. The following entering determiner 33 may judge that the subject vehicle A will not perform following entering also when the preceding vehicle C is reducing the speed and it is predicted that the preceding vehicle C will be almost stopped at the time of entering the intersection. This is because, when the preceding vehicle C is almost stopped at the intersection, it is predicted that the driver of the subject vehicle A will pay enough attention when the subject vehicle A catches up with the preceding vehicle C.

What is claimed is:

1. A driving support device, comprising:
   a subject vehicle information acquirer configured to acquire subject vehicle information including position information and behavior information of a subject vehicle traveling toward an intersection;
   an another vehicle information acquirer configured to acquire another vehicle information including position information and behavior information of another vehicle transmitted from the another vehicle via inter-vehicle communication;
   a preceding vehicle information acquirer configured to acquire preceding vehicle information including position information and behavior information of a preceding vehicle traveling in front of the subject vehicle;
   a support processor configured to perform driving support processing of outputting a warning when it is judged that there is a possibility of collision between the subject vehicle and the another vehicle on the basis of subject vehicle information acquired by the subject vehicle information acquirer and another vehicle information acquired by the another vehicle information acquirer;
   a subject vehicle information predictor configured to predict an arrival time at which the subject vehicle will arrive at the intersection, on the basis of subject vehicle information acquired by the subject vehicle information acquirer;
   a preceding vehicle information predictor configured to predict the position of the preceding vehicle at the time when the predicted arrival time occurs, on the basis of preceding vehicle information acquired by the preceding vehicle information acquirer; and
   a support execution determiner configured to determine whether to permit or forbid the support processor to perform driving support processing, in accordance with the predicted position of the preceding vehicle.

2. The driving support device of claim 1, wherein the support execution determiner permits the support processor to perform driving support processing when the predicted position of the preceding vehicle is within or beyond the intersection, and the support execution determiner forbids the support processor to perform driving support processing when the predicted position of the preceding vehicle is before the intersection.

3. The driving support device of claim 1, wherein:
   the subject vehicle information predictor predicts the behavior of the subject vehicle at the time when the predicted arrival time occurs, on the basis of subject vehicle information acquired by the subject vehicle information acquirer;
   the preceding vehicle information predictor predicts the position and behavior of the preceding vehicle at the time when the predicted arrival time occurs, on the basis of preceding vehicle information acquired by the preceding vehicle information acquirer;
   the driving support device further comprises a following entering determiner configured to determine whether or not the subject vehicle travels close to the preceding vehicle in the same direction at the intersection, on the basis of the behavior of the subject vehicle predicted by the subject vehicle information predictor and the position and behavior of the preceding vehicle predicted by the preceding vehicle information predictor; and
   the support execution determiner permits the support processor to perform driving support processing when the following entering determiner judges that the subject vehicle travels close to the preceding vehicle in the same direction.

* * * * *